United States Patent
Seibt

(10) Patent No.: US 9,908,627 B2
(45) Date of Patent: Mar. 6, 2018

(54) LAYOUT OF A SANITARY UNIT

(71) Applicant: Airbus Operations GmbH, Hamburg (DE)

(72) Inventor: Christian Seibt, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/645,523

(22) Filed: Mar. 12, 2015

(65) Prior Publication Data

US 2015/0259070 A1 Sep. 17, 2015

(30) Foreign Application Priority Data

Mar. 14, 2014 (DE) .......... 10 2014 103 522

(51) Int. Cl.
B64D 11/02 (2006.01)

(52) U.S. Cl.
CPC ......... B64D 11/02 (2013.01); *Y10T 29/49826* (2015.01)

(58) Field of Classification Search
CPC .............................. B64D 11/02; B64D 11/04
USPC ....................................................... 244/118.5
See application file for complete search history.

(56) References Cited

U.S. PATENT DOCUMENTS

| | | | |
|---|---|---|---|
| 8,602,354 B2* | 12/2013 | Sutthoff ................. | B64D 11/02 244/118.5 |
| 8,672,267 B2 | 3/2014 | Schliwa et al. | |
| 2004/0163170 A1* | 8/2004 | Cooper .................. | B64D 11/02 4/664 |
| 2004/0227034 A1* | 11/2004 | Wentland .............. | B64D 11/02 244/119 |
| 2013/0206907 A1* | 8/2013 | Burrows ................ | B64D 11/02 244/118.5 |
| 2014/0196206 A1* | 7/2014 | Savian ................... | B64D 11/02 4/664 |
| 2014/0360099 A1* | 12/2014 | McIntosh ............... | E03D 11/00 49/371 |

(Continued)

FOREIGN PATENT DOCUMENTS

| | | | |
|---|---|---|---|
| DE | 10 2008 015 788 A1 | 10/2009 | |
| DE | 102012003713 A1 * | 8/2013 | ............ B64D 11/02 |
| EP | 2818411 A1 | 12/2014 | |

(Continued)

OTHER PUBLICATIONS

European Search Report dated Aug. 25, 2015 (EP15158413.3).
German Search Report (10 2014 103 522.4) dated Dec. 3, 2014.

*Primary Examiner* — Joseph W Sanderson
*Assistant Examiner* — Aaron M Rodziwicz
(74) *Attorney, Agent, or Firm* — Lerner, David, Littenberg, Krumholz & Mentlik, LLP

(57) ABSTRACT

A sanitary unit for a cabin region on board a vehicle is provided with a first lavatory facility and a second lavatory facility. The first and the second lavatory facilities in each case form a longitudinally-directed interior space comprising two longitudinal sides and two narrow sides. In each case a narrow side comprises an access door. The first and the second lavatory facilities adjoin each other by their longitudinal sides and are separated from each other by a shared middle wall. The shared middle wall extends between lateral connection regions on the narrow sides and comprises at least one offset at least in a middle region between the two lateral connection regions in the horizontal direction.

12 Claims, 4 Drawing Sheets

(56) References Cited

U.S. PATENT DOCUMENTS

2015/0096118 A1* 4/2015 McIntosh ............... B64D 11/02
                                                                4/664

FOREIGN PATENT DOCUMENTS

| | | |
|---|---|---|
| GB | 2 410 431 A | 8/2005 |
| WO | 2004/076279 A2 | 9/2004 |
| WO | 2011/101385 A2 | 8/2011 |
| WO | 2013/123075 A1 | 8/2013 |
| WO | 2013/125230 A1 | 8/2013 |
| WO | 2014/057669 A1 | 4/2014 |
| WO | 2014/124381 A1 | 8/2014 |

* cited by examiner

LAYOUT OF A SANITARY UNIT

FIELD OF THE INVENTION

The present invention relates to sanitary units on board an aircraft and relates, in particular, to a sanitary unit for a cabin region on board a vehicle, to an aircraft, to a method for creating a sanitary unit, and to the use of a sanitary unit.

BACKGROUND OF THE INVENTION

In order to provide sanitary services to passengers on board a vehicle, sanitary units are provided in the cabin region. Passengers can use these sanitary units while on board the vehicle, for instance on board an aircraft. In sanitary units, for instance, toilets and wash basins are provided. In order to utilize as efficiently as possible the space available on board a vehicle, sanitary areas are often designed to be as compact and thus space-saving as possible. WO 2011/101385 A2 describes an arrangement of several lavatory facilities in combination with a storage cabinet. However, a compact design of the sanitary area restricts the user's freedom of movement. Furthermore, it has been shown that sanitary units on board a vehicle could still be further reduced in size so that the area or space saved can be utilized for other purposes.

BRIEF SUMMARY OF THE INVENTION

An embodiment of the present invention provides as compact a sanitary area as possible on board a vehicle, with which sanitary area nevertheless a smooth movement sequence is possible for users.

According to an embodiment of the invention, a sanitary unit for a cabin region on board a vehicle is provided. The sanitary unit comprises a first lavatory facility and a second lavatory facility. The first and the second lavatory facilities in each case form a longitudinally-directed interior space comprising two longitudinal sides and two narrow sides. In each case a narrow side comprises an access door. The first and the second lavatory facilities adjoin each other by their longitudinal sides and are separated from each other by a shared middle wall. The shared middle wall extends between lateral connection regions on the narrow sides and comprises at least one offset at least in a middle region between the two lateral connection regions in the horizontal direction.

The vehicle is, for instance, an aircraft, e.g. an airplane. In one example, the middle wall comprises two, three, four or more changes of direction.

The offset provided in the middle wall makes it possible to provide differently-dimensioned space regions of the two adjoining lavatory facilities, so that in these on the one hand the functional elements of the lavatory facility can be arranged in a space-saving manner, and on the other hand a smooth movement sequence is possible for users when using the sanitary area.

The shared middle wall is designed so as to be fixed, i.e. immovable.

In one example, the first and the second lavatory facilities adjoin each other by their longitudinal sides along the entire length.

The term "longitudinally-directed" relates to an interior space that because of its spatial design comprises a longer and a shorter spatial direction. The difference is, for instance, at least 10% or more.

According to one example, the offset is designed as a transition region between a first wall section and a second wall section. The first and the second wall sections extend, relative to the spatial width of the first or of the second lavatory facility, so as to be arranged in different space delimitation depths.

For example, the offset, which is designed as a transition region, forms a separate wall surface or wall section, in addition to the first and second wall sections.

In one example, the offset is thus designed as a transition region between the first wall section and the second wall section and the two wall sections finish the respective lavatory facility in different space delimitation depths. In other words, in the region of the first wall section the lavatory facility is bigger (or smaller) than in the region of the second wall section, and in the region of the second wall section is smaller (or bigger) than in the region of the first wall section.

In one example, the offset is designed as a transition region between two straight wall sections.

The transition region can also be referred to as an intermediate piece.

The transition region can be designed as individual straight wall surface regions. The transition region can also be designed as a curved wall surface region.

According to one example, the shared middle wall comprises two wall components, between which the offset is formed. The two wall components adjoin each other and extend at an angle to each other. The offset is designed as a kink between the two connecting wall components.

According to one example, the shared middle wall comprises two wall components between which the offset is formed. Between the two wall components a middle wall component is provided, which the two wall components adjoin. The middle wall component and the two lateral wall components are designed as straight surfaces. The adjoining surfaces extend at an angle to each other.

In one example, the two lateral wall components extend so as to be parallel to each other. In another example, the two lateral wall components extend at an angle to each other.

For example, the transition region has a Z-shaped progression.

For example, the middle wall is designed as a wall construction that is continuous beyond the offset.

For example, the middle wall has a wall design that is identical along its entire length. For example, the middle wall comprises an identical cross section along the entire wall surface, i.e. an identical thickness.

According to one example, the first and the second lavatory facilities in each case comprise a toilet (WC) and a wash basin. In each case the toilet is arranged on the narrow side opposite the access door. The wash basin can be arranged along one of the two longitudinal sides or along the middle wall.

According to one example, the at least one offset in one of the two lavatory facilities forms a projection, and in the other of the two lavatory facilities at the same time forms a recess.

According to one example, the offset is designed as a recess in the second lavatory facility and as a corresponding projection in the first lavatory facility. The toilet is arranged in the second lavatory facility in such a manner that a middle region of a toilet seat is arranged in the region of the recess. The toilet in the first lavatory facility is arranged in such a manner that a middle region of a toilet seat, when viewed from the access door, is arranged behind the projection.

According to one example, the middle wall in the first lavatory facility, when viewed from the access door, extends behind the offset in an inwards-offset manner, and in the second lavatory facility, when viewed from the access door, extends in front of the offset in an inwards-offset manner. In the second lavatory facility, the wash basin, when viewed from the access door, is arranged behind the offset.

According to one example, along the middle wall in the direction of extension of the wall two offsets are formed as a first offset and as a second offset. The first offset is formed as a recess in one of the two spaces, and as a projection in the other of the two spaces. The second offset is formed as a projection in one of the two spaces, and as a recess in the other of the two spaces.

In one example, the two toilets are arranged relative to each other so as to be offset in the direction of the longitudinal direction, and in each case the middle wall is recessed in the shoulder region of a person sitting on the toilet.

In one example, the middle wall is designed so as to be offset in such a manner, and when viewed from the access door forms a projection so that in the first lavatory facility in the region of the access door the width of the space is wider than in the region of the toilet. In the first lavatory facility in the region of the wider width of the space a seat is formed. As an option, in the first lavatory facility in the region of the wider width of the space, a wash basin is also provided. In the second lavatory facility the middle wall is designed so as to be offset in such a manner, and when viewed from the access door, forms a recess so that in the second lavatory facility in the region of the access door, the width of the space is narrower than in the region of the toilet. In the second lavatory facility, in the region of the wider width of the space, a wash basin is provided.

According to one example, the middle wall, when viewed from the access door, comprises a front wall region and a rear wall region. The front and the rear wall regions extend as parallel wall surfaces.

According to one example, the middle wall when viewed from the access door comprises a front wall region and a rear wall region. The offset, formed as a transition region, is designed as a middle wall region. The front and the rear regions extend obliquely relative to each other. The middle wall region extends obliquely relative to the front and to the rear wall regions.

According to one example, at least one of the two lavatory facilities comprises a transfer seat that is arranged on the middle wall between the access door and the toilet.

According to one example, the first and the second lavatory facilities are designed so as to be identically aligned so that the access doors are arranged side by side.

According to one example, the sanitary unit comprises a plurality of three or more lavatory facilities that are arranged so as to be adjacent and so as to adjoin each other by their longitudinal sides. Several shared middle walls are provided, which in each case comprise an offset.

According to the invention, furthermore, an aircraft is provided that comprises a fuselage structure and a cabin region arranged within the fuselage structure. The cabin region comprises at least one WC area (toilet area) with two lavatory facilities. The at least one WC area is designed as a sanitary unit according to any one of the preceding examples.

The aircraft is, for instance, an airplane, a helicopter or a dirigible.

According to the invention, furthermore, a method for creating a sanitary unit with at least two lavatory facilities is provided. The method comprises the following steps:

a) providing a first and a second lavatory facility, which in each case form a longitudinally-directed interior space that comprises two longitudinal sides and two narrow sides, wherein the first and the second lavatory facilities adjoin each other by their longitudinal sides;

b) in each case forming a narrow side with an access door;

c) providing a separation between the first and the second lavatory facilities by means of a shared middle wall. The shared middle wall extends between lateral connection regions on the narrow sides and comprises at least one offset at least in a middle region between the two lateral connection regions in the horizontal direction.

According to an aspect of the invention, furthermore, the use of a sanitary unit according to any one of the above-mentioned examples in an aircraft is provided.

According to one aspect of the invention, two adjacent lavatory facilities are divided from each other by a shared wall that comprises an offset in order to provide different spatial depths. The offset is, for instance, designed as a Z-shaped offset. For example, the wall is designed as a Z-wall.

It should be pointed out that characteristics of the exemplary embodiments of the devices also apply to embodiments of the method and use of the device, and vice versa. Furthermore, it is also possible to freely combine those characteristics, in which this has not been explicitly mentioned.

BRIEF DESCRIPTION OF THE DRAWINGS

Below, exemplary embodiments of the invention are presented in more detail with reference to the enclosed drawings. The following is shown.

DETAILED DESCRIPTION

Figure 1A:
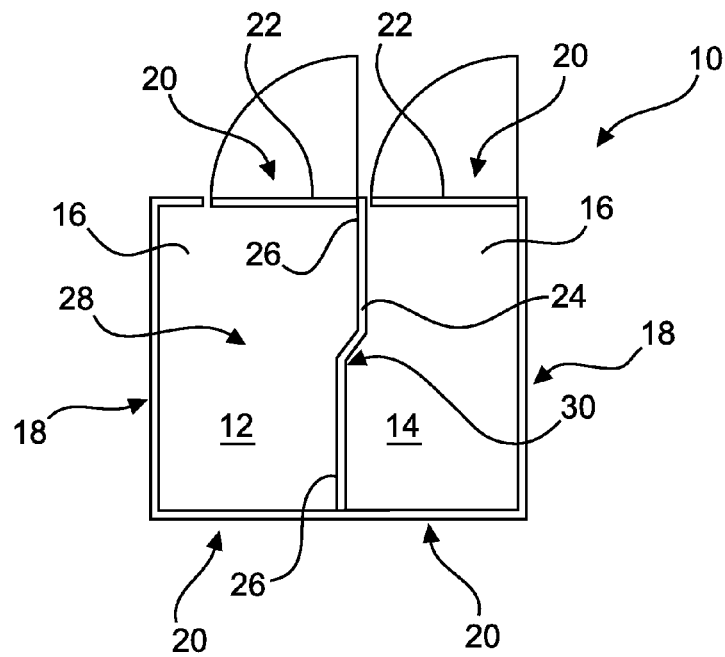
FIGS. 1a-1c show a diagrammatic horizontal projection of an example of a sanitary area in FIG. 1a; a section of a middle wall in a first example in FIG. 1b, and in a second example in FIG. 1c.

FIG. 1a shows a sanitary unit 10 for a cabin region on board a vehicle. The sanitary unit comprises a first lavatory facility 12 and a second lavatory facility 14. The first and the second lavatory facilities 12, 14 in each case form a longitudinally-directed interior space 16 that comprises two longitudinal sides 18 and two narrow sides 20. In each case a narrow side comprises an access door 22. The first and the second lavatory facilities 12, 14 adjoin each other by their longitudinal sides and are separated from each other by a shared middle wall 24. The shared middle wall 24 extends between lateral connection regions 26 on the narrow sides 20. The shared middle wall 24 at least in a middle region 28 between the two lateral connection regions 26 in the horizontal direction comprises at least one offset 30.

The sanitary unit 10 is, for instance, provided on board an aircraft, e.g. on board an airplane.

Figure 1B:
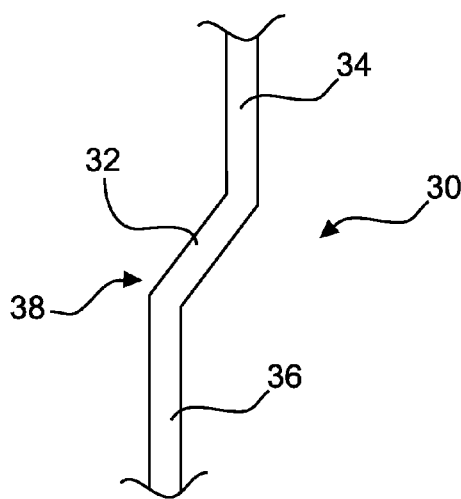

FIG. 1B shows an example, in which the offset 30 is designed as a transition region 32 provided between a first wall section 34 and a second wall section 36. The first and the second wall sections 34, 36 extend, relative to the spatial width of the first or the second lavatory facility 12, 14, so as to be arranged in different space delimitation depths. In other words, the first and the second wall sections 34, 36 enable to achieve different spatial depths of the two adjoining lavatory facilities. The spatial depth can also be referred to as spatial width.

Figure 1C:
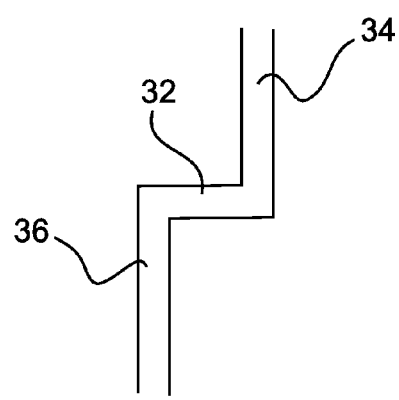

The transition region 32 forms, for instance, a Z-shaped progression 38 that is arranged obliquely relative to the two adjoining wall sections, as is shown in FIG. 1B; or the transition region 32 forms a rectangular progression, as is indicated in FIG. 1C. The middle wall is, for instance, designed as a wall construction that extends continuously beyond the offset 30. For example, the middle wall features a wall design that is uniform throughout. For example, the middle wall comprises an identical cross section, i.e. an identical thickness along its entire extension.

Figure 2A:
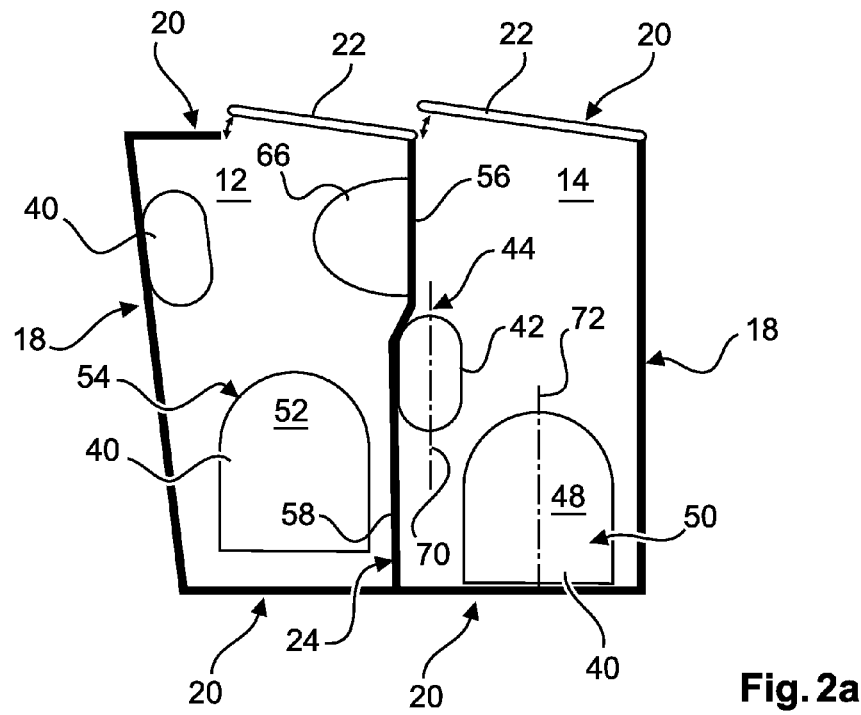
FIGS. 2a-2b show a horizontal section of a first example of a sanitary unit in FIG. 2A, and of a second example in FIG. 2B.

FIG. 2A shows a further example of the sanitary unit 10, in which the first lavatory facility 12 and the second lavatory facility 14 in each case comprise a toilet (WC) 40 and a wash basin 42. The toilet 40 is arranged on the narrow side opposite the access door 22.

In a further example, in FIG. 2A shown as an option, the offset in the second lavatory facility 14 is designed as a recess 44 and in the first lavatory facility 12 as a projection 46. In the second lavatory facility 14 the toilet 40 is arranged in such a manner that a middle region 48 of a toilet seat 50 is arranged in the region of the recess 44. In the first lavatory facility 12 the toilet 40 is arranged in such a manner that a middle region 52 of a toilet seat 54, when viewed from the access door 22, is arranged behind the projection 46.

According to a further example, in FIG. 2A shown as an additional option, the middle wall 24 in the first lavatory facility 12, when viewed from the access door, extends behind the offset 46 in an inwards-offset manner. In the second lavatory facility 14 the middle wall 24, when viewed from the access door 22, extends in front of the offset in an inwards-offset manner. In the second lavatory facility 14 the wash basin 42, when viewed from the access door 22, is arranged behind the offset 30.

According to a further example, shown in FIG. 2A as a further option, the middle wall 24 comprises a front wall region 56 and a rear wall region 58 when viewed from the access door 22. The front and the rear wall regions 56, 58 extend as parallel wall surfaces.

Figure 2B:
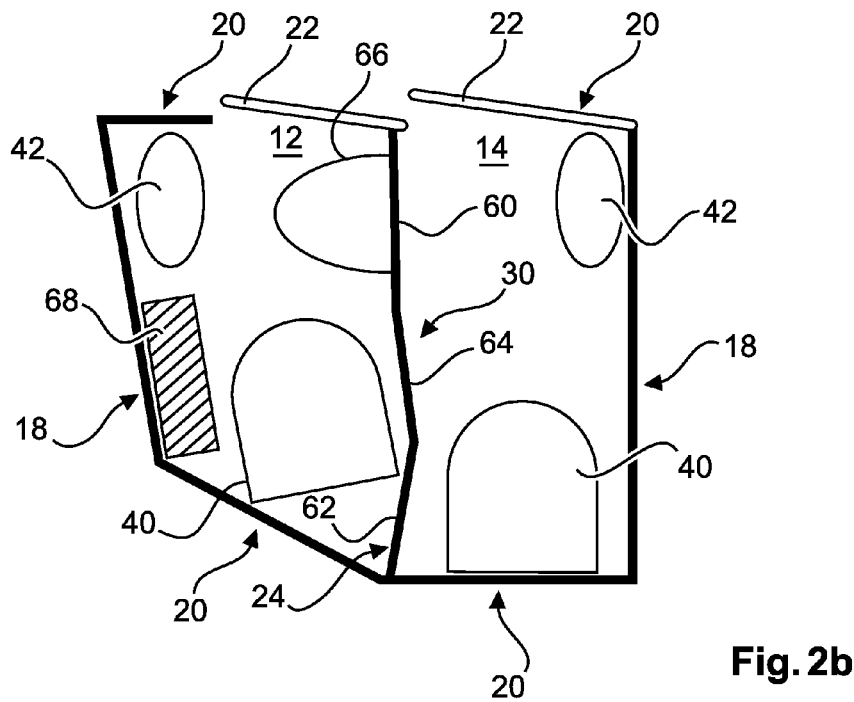

FIG. 2B shows an example, in which the middle wall 24 comprises a front wall region 60 and a rear wall region 62 when viewed from the access door 22. The offset 30, formed as a transition region, is designed as a middle wall region 64. The front and the rear regions 60, 62 extend obliquely relative to each other. The middle wall region 64 extends obliquely relative to the front and the rear wall regions 60, 62.

A further example, shown in FIG. 2A and FIG. 2B as an option, provides that at least one of the two lavatory facilities 12, 14 comprises a transfer seat 66 that is arranged on the middle wall 24 between the access door 22 and the toilet 40.

A further example, not shown in detail, provides that the sanitary unit comprises a plurality of three or more lavatory facilities that are arranged so as to be adjacent and so as to longitudinally adjoin each other. In this embodiment several shared middle walls are provided which in each case comprise an offset.

In FIG. 2B, as a further option, an accommodation space, i.e. a storage space 68, is indicated, in which an on-board wheelchair (specially designed wheelchair for use on board an aircraft, and which is foldable and which, especially in terms of its width, is designed taking into account the usual dimensions in the cabin region) can be accommodated in its folded state.

In FIG. 2A the toilet 40, when viewed from the narrow side 20, is arranged so as to be offset, displaced into the interior space. The wash basin 42 is arranged in a laterally widened region and with a center line 70 extends parallel to the longitudinal axis 72 of the toilet.

In a further example (not shown), the toilet 40, when viewed from the narrow side 20, is arranged so as to be offset, displaced into the interior space. The wash basin 42 is arranged in a laterally widened region. In the second lavatory facility 14 the wash basin 42 is arranged with the center line 70 extending obliquely relative to the longitudinal axis 72 of the toilet in the lavatory facility.

In FIG. 2B, the toilet is arranged in the region of the middle wall region 64, and relative to the imaginary spatial axis is arranged so as to be slightly rotated, for example in order to approximately correspond to the obliquely extending middle wall region 64.

Figure 3:
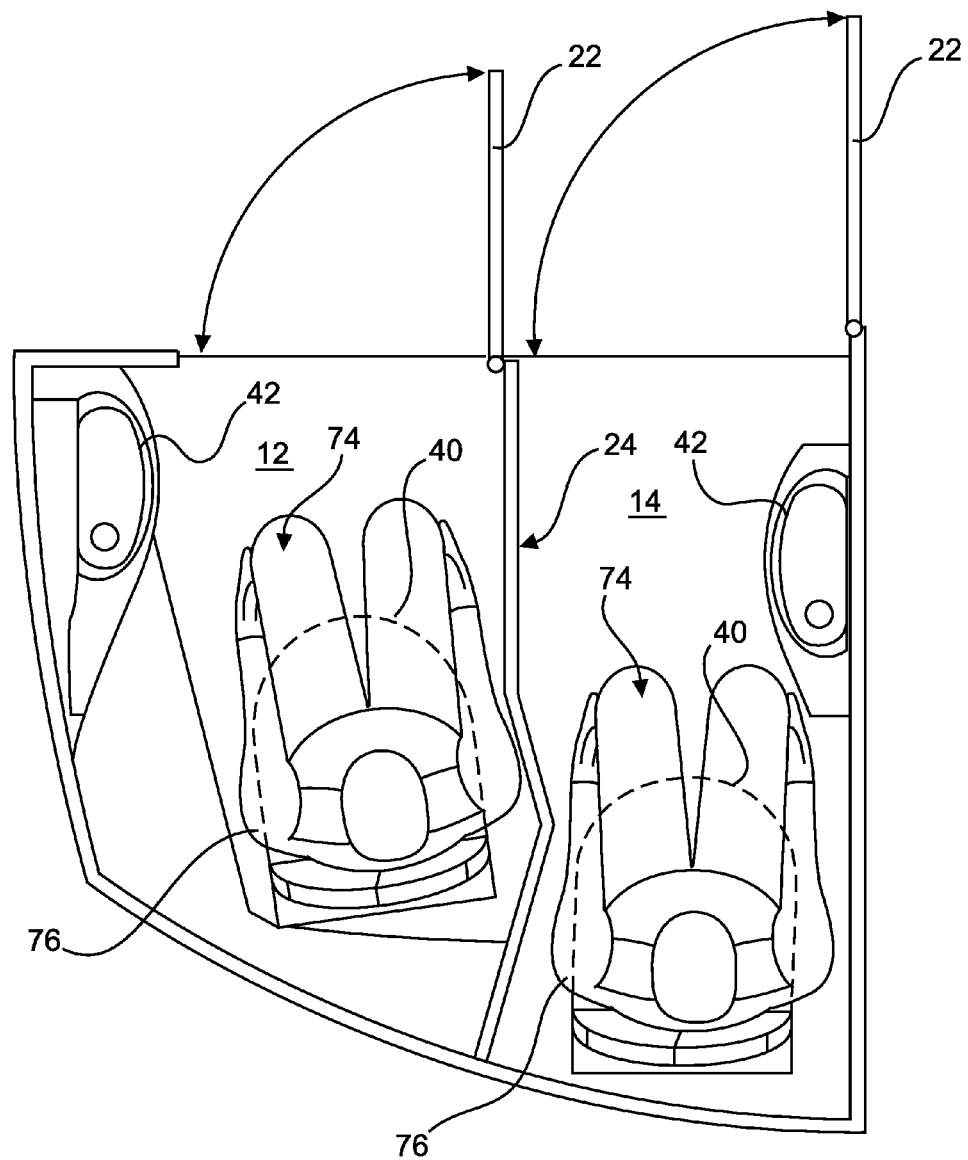
FIG. 3 a horizontal section or horizontal projection of a further example of a sanitary unit.

In FIG. 3, to supplement FIG. 2B, an example is shown, in which a passenger 74 is shown sitting on the toilet 40. As can be seen when using the toilet 40 the passenger 74 has sufficient freedom of movement in the region of the shoulders 76, both in the first lavatory facility 12 and in the second lavatory facility 14.

According to the invention, in one example it is provided that by an offset arrangement, e.g. of the toilets, i.e. of the WCs, and the geometric arrangement of a wall in a Z-shaped progression, the lavatory facility can be designed to be narrower so that space is saved that is available for the aircraft, e.g. for seat arrangements or for modules or monuments. In this design the offset progression of the wall is tailored to usage; it takes into account in particular the shoulder width of users as a space-determining dimension in terms of minimum measurements.

Figure 4:
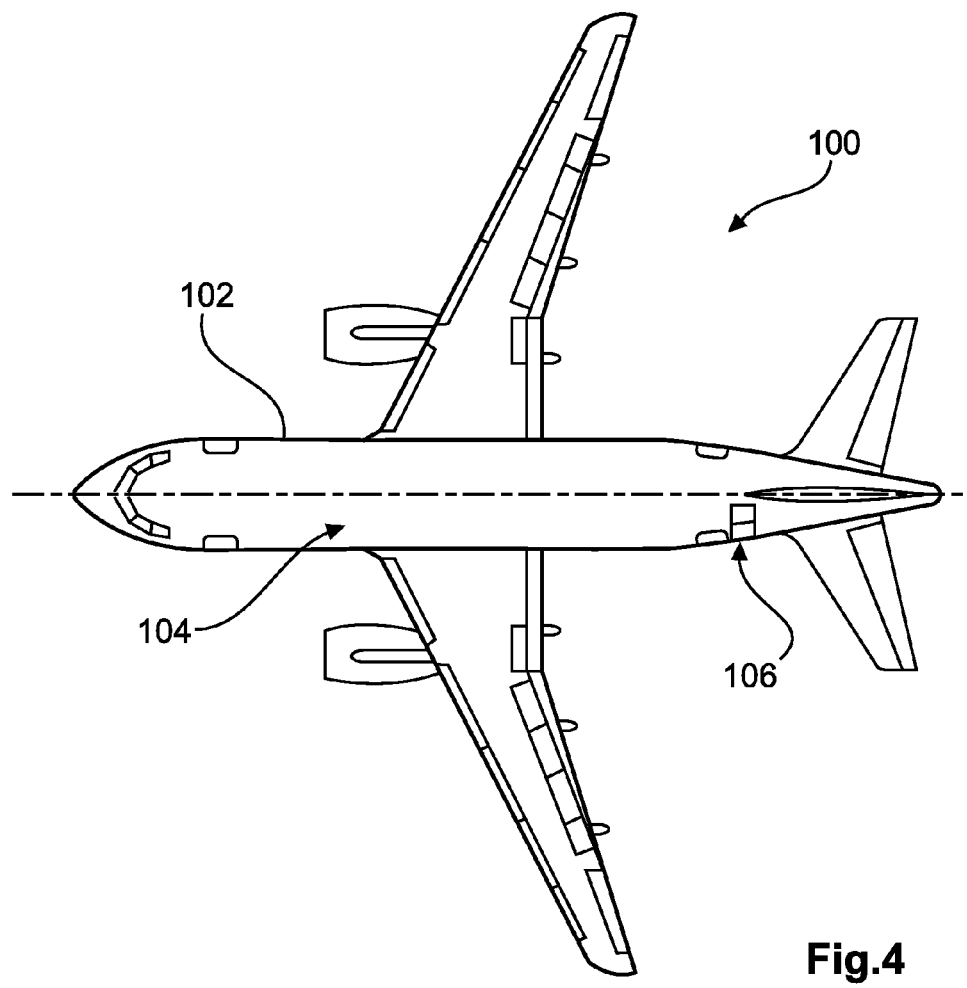
FIG. 4 a diagrammatic view of an example of an aircraft.

FIG. 4 shows an example of an aircraft 100 comprising a fuselage structure 102 and a cabin region 104 arranged within the fuselage structure 102. The cabin region 104 comprises at least one WC area 106 (toilet area) with two lavatory facilities, and the at least one WC area is designed as sanitary unit 10 according to any one of the preceding examples. The aircraft is, for instance, an airplane, or a helicopter (not shown in detail) or a dirigible (not shown either).

Figure 5:
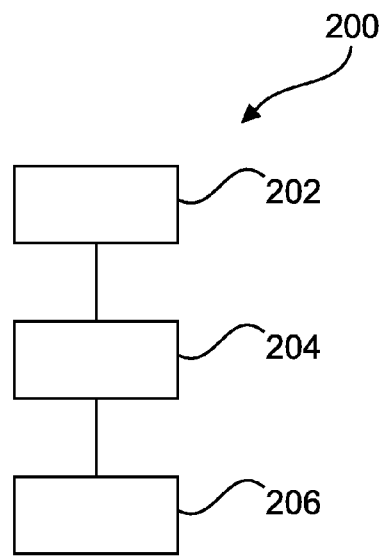
FIG. 5 steps of an example of a method for creating a sanitary unit.

FIG. 5 diagrammatically shows steps of a method 200 for creating a sanitary unit with at least two lavatory facilities. The method 200 comprises the following steps:

In a first step 202, a first lavatory facility and a second lavatory facility are provided, which in each case form a longitudinally-directed interior space that comprises two longitudinal sides and two narrow sides. The first and the second lavatory facilities adjoin each other by their longitudinal sides.

In a second step 204, it is provided in each case to equip a narrow side with an access door.

In a third step 206, separation of the first and of the second lavatory facilities by a shared middle wall is provided. The shared middle wall extends between lateral connection regions on the narrow sides and comprises at least one offset at least in a middle region between the two lateral connection regions in the horizontal direction.

The first step 202 is also referred to as step a), the second step 204 as step b), and the third step 206 as step c).

The exemplary embodiments described above can be combined in different ways. In particular, aspects of the method can also be used for embodiments of the devices and the use of the devices, and vice versa.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sanitary unit for a cabin region on board a vehicle, comprising:
    a first lavatory facility and a second lavatory facility;
    wherein the first lavatory facility forms a first longitudinally-directed interior space comprising first and second longitudinal sides and first and second narrow sides, the first narrow side comprising a first access door;
    wherein the second lavatory facility forms a second longitudinally-directed interior space comprising third and fourth longitudinal sides and third and fourth narrow sides, the third narrow side comprising a second access door;
    wherein the first and the second lavatory facilities adjoin each other by one of the first and second longitudinal sides and one of the third and fourth longitudinal sides and -share a middle wall;
    wherein the shared middle wall extends between lateral connection regions on the narrow sides and comprises at least one offset at least in a middle region between the two lateral connection regions in the horizontal direction,
    wherein the first lavatory facility and the second lavatory facility are configured so as to be identically aligned so that the first and second access doors are arranged side by side,
    wherein the first lavatory facility comprises a first toilet and a first wash basin, wherein the second lavatory facility comprises a second toilet and a second wash basin, wherein the first toilet is arranged on the second narrow side opposite the first access door, and wherein the second toilet is arranged on the fourth narrow side opposite the second access door, and
    wherein the middle wall, when viewed from at least one of the first and second access doors, comprises a front wall region and a rear wall region, wherein the offset, formed as a transition region, is configured as a middle wall region, wherein the front and the rear regions extend obliquely relative to each other, and wherein the middle wall region extends obliquely relative to the front and to the rear wall regions.

2. The sanitary unit of claim 1, wherein the offset is configured as a transition region between a first wall section and a second wall section; and
    wherein the first and the second wall sections extend in different spatial depths of the first or of the second lavatory facility in relation to a longitudinal axis providing different space delimitation depths transverse to the longitudinal axis.

3. The sanitary unit of claim 1, wherein the shared middle wall comprises first and second wall components, between which the offset is formed;
    wherein the first and second wall components adjoin each other; and
    wherein the first and second wall components extend at an angle to each other, and the offset is configured as a kink between the first and second connecting wall components.

4. The sanitary unit of claim 1, wherein the shared middle wall comprises first and second wall components, between which the offset is formed; and
    wherein, between the first and second wall components, the unit comprises a middle wall component, which the first and second wall components adjoin;
    wherein the middle wall component and the first and second lateral wall components are configured as straight surfaces; and
    wherein the adjoining surfaces extend at an angle to each other.

5. The sanitary unit of claim 1, wherein the at least one offset in one of the first and second lavatory facilities forms a projection, and in the other of the first and second lavatory facilities at the same time forms a recess.

6. The sanitary unit of claim 1, wherein the offset is configured as a recess in the second lavatory facility and as a projection in the first lavatory facility;
    wherein the second toilet is arranged in the second lavatory facility in such a manner that a middle region of a toilet seat is arranged in the region of the recess; and
    wherein the first toilet in the first lavatory facility is arranged in such a manner that a middle region of a toilet seat, when viewed from the first access door, is arranged behind the projection.

7. The sanitary unit of claim 1, wherein the middle wall in the first lavatory facility, when viewed from the first access door, extends behind the offset in an inwards-offset manner, and in the second lavatory facility, when viewed from the second access door, extends in front of the offset in an inwards-offset manner; and
    wherein in the second lavatory facility the second wash basin, when viewed from the second access door, is arranged behind the offset.

8. The sanitary unit of claim 1, wherein along the middle wall, in the direction of extension of the wall, two offsets are formed as a first offset and as a second offset;
    wherein the first offset is formed as a recess in one of the two spaces, and as a projection in the other of the two spaces; and
    wherein the second offset is formed as a projection in one of the two spaces, and as a recess in the other of the two spaces.

9. The sanitary unit of claim 1, wherein at least one of the first and second lavatory facilities comprises a transfer seat arranged on the middle wall between the access door and the toilet.

10. The sanitary unit of claim 1, wherein the sanitary unit further comprises at least a third lavatory facility arranged so as to be adjacent and so as to adjoin at least one of the first lavatory facility and the second lavatory facility by the longitudinal sides; and at least a second shared middle wall comprising an offset.

11. An aircraft comprising:
a fuselage structure; and
a cabin region arranged within the fuselage structure;
wherein the cabin region comprises at least one WC area with first and second lavatory facilities; and
wherein the at least one WC area comprises:
wherein the first lavatory facility forms a first longitudinally-directed interior space comprising first and second longitudinal sides and first and second narrow sides, the first narrow side comprising a first access door;
wherein the second lavatory facility forms a second longitudinally-directed interior space comprising third and fourth longitudinal sides and third and fourth narrow sides, the third narrow side comprising a second access door;
wherein the first and the second lavatory facilities adjoin each other by one of the first and second longitudinal sides and one of the third and fourth longitudinal sides and share a middle wall;
wherein the shared middle wall extends between lateral connection regions on the narrow sides and comprises at least one offset at least in a middle region between the two lateral connection regions in the horizontal direction,
wherein the first and second lavatory facilities are configured so as to be identically aligned so that the first and second access doors are arranged side by side,
wherein the first lavatory facility comprises a first toilet and a first wash basin, wherein the second lavatory facility comprises a second toilet and a second wash basin, wherein the first toilet is arranged on the second narrow side opposite the first access door, and wherein the second toilet is arranged on the fourth narrow side opposite the second access door, and
wherein the middle wall, when viewed from at least one of the first and second access doors, comprises a front wall region and a rear wall region, wherein the offset, formed as a transition region, is configured as a middle wall region, wherein the front and the rear regions extend obliquely relative to each other, and wherein the middle wall region extends obliquely relative to the front and to the rear wall regions.

12. A method for creating a sanitary unit with at least two lavatory facilities, wherein the method comprises:
a) providing a first lavatory facility forming a first longitudinally-directed interior space comprising first and second longitudinal sides and first and second narrow sides and forming the first narrow side with a first access door;
b) providing a second lavatory facility forming a second longitudinally-directed interior space comprising third and fourth longitudinal sides and third and fourth narrow sides and forming the third narrow side with a second access door, wherein the first and the second lavatory facilities adjoin each other by one of the first and second longitudinal sides and one of the third and fourth longitudinal sides;
and
c) providing a shared middle wall;
wherein the shared middle wall extends between lateral connection regions on the narrow sides and comprises at least one offset at least in a middle region between the two lateral connection regions in the horizontal direction,
wherein the first and the second lavatory facilities are configured so as to be identically aligned so that the first and second access doors are arranged side by side,
wherein the first lavatory facility comprises a first toilet and a first wash basin, wherein the second lavatory facility comprises a second toilet and a second wash basin, wherein the first toilet is arranged on the second narrow side opposite the first access door, and wherein the second toilet is arranged on the fourth narrow side opposite the second access door, and
wherein the middle wall, when viewed from at least one of the first and second access doors, comprises a front wall region and a rear wall region, wherein the offset, formed as a transition region, is configured as a middle wall region, wherein the front and the rear regions extend obliquely relative to each other, and wherein the middle wall region extends obliquely relative to the front and to the rear wall regions.

* * * * *